Jan. 18, 1944.   B. L. SMITH   2,339,657
PHOTOGRAPHIC IDENTIFICATION EQUIPMENT UNIT
Filed March 20, 1941   9 Sheets-Sheet 1

INVENTOR.
Byron L. Smith
BY
his Attorneys

Jan. 18, 1944.      B. L. SMITH      2,339,657
PHOTOGRAPHIC IDENTIFICATION EQUIPMENT UNIT
Filed March 20, 1941      9 Sheets-Sheet 2

Jan. 18, 1944. B. L. SMITH 2,339,657
PHOTOGRAPHIC IDENTIFICATION EQUIPMENT UNIT
Filed March 20, 1941 9 Sheets-Sheet 4

Fig. 7.

INVENTOR.
Byron L. Smith
BY
his Attorneys

Jan. 18, 1944. B. L. SMITH 2,339,657
PHOTOGRAPHIC IDENTIFICATION EQUIPMENT UNIT
Filed March 20, 1941 9 Sheets-Sheet 8

INVENTOR.
Byron L. Smith
BY
his Attorneys

Jan. 18, 1944.     B. L. SMITH     2,339,657
PHOTOGRAPHIC IDENTIFICATION EQUIPMENT UNIT
Filed March 20, 1941     9 Sheets-Sheet 9

INVENTOR.
Byron L. Smith
BY
his Attorneys

Patented Jan. 18, 1944

2,339,657

UNITED STATES PATENT OFFICE 2,339,657

PHOTOGRAPHIC IDENTIFICATION EQUIPMENT UNIT

Byron L. Smith, East Rochester, N. Y., assignor to The Folmer Graflex Corporation, Rochester, N. Y., a corporation of Delaware Application March 20, 1941, Serial No. 384,322

17 Claims. (Cl. 95—11)

This invention relates to a new and improved apparatus particularly adapted for making photographic identification pictures.

In order that the principle of the invention may be readily understood, I have disclosed a single embodiment thereof in the accompanying drawings, wherein—

Fig. 17 is a vertical, transverse section through Fig. 14 on the broken line 17—17 showing the arrangement of the said numbering disks.

Important objects of this invention are: to provide a photographic equipment unit that is readily adjusted to the proper working height of the individual to be photographed; to provide such a unit having a background screen graduated to indicate the height of the subject being photographed; to provide such a unit having illuminating means that is automatically adjusted so that subjects of varying heights will be properly illuminated; to provide a photographic apparatus having a numbering device under the control of the operator so that an identification number is photographed along with the subject; to provide a viewing system whereby the photographic subject can see the image substantially as it will appear in the photograph; to provide a photographic equipment unit having a single control for advancing the film and operating the shutter; to provide an interlocking means between the film feeding and the shutter operation to prevent double exposures; and to provide view finding means whereby the operator can readily adjust the height of the photographic equipment unit properly to frame the subject being photographed. These and other objects of the invention are best accomplished by the preferred embodiment of the invention herein disclosed, which constitutes an improvement upon the patent to Folmer No. 1,324,887, December 16, 1919, in that it permits the making of identification pictures in a minimum of time, and which embodiment I will now specifically described, but to which my invention is not limited.

There has long been need for an apparatus especially designed and constructed for the purpose of making identification photographs, producing pictures of a high quality, properly lighted, so that the resulting photographs are good likenesses of the subjects photographed. It is also desirable at times to cause to be photographed, at the same time the subject is photographed, a height scale readily to indicate the height of such subject. Such height scale should be of such construction that it can readily be omitted, as it is often desirable when photographing certain subjects that such information be omitted from the photograph thereof. It is also usually desirable to photograph a number, so as to identify the subject, at the same time the photograph is made. Here again, it is sometimes desirable to make photograps without any number appearing thereon. Both of these objects are fully accomplished in and by my invention.

When photographing a large number of subjects, it is essential that the apparatus, with a minimum amount of effort on the part of the operator, be quickly adjustable to the proper elevation for making the photograph, so that the resulting photograph will be properly located in the exposure area. It is also desirable that the subject have a definite idea how the photograph will appear on the finished print. These objects are also fully accomplished in my invention.

Since the apparatus embodying my invention usually is operated by someone that is not particularly schooled in the photographic art, it is necessary that the equipment be as near fool-proof as possible. In my invention I have so coordinated the several functioning parts thereof that the illuminating means travels with the view finding means, and thereby assures proper lighting regardless of the position of the apparatus table. In the operation of the apparatus herein disclosed, the necessary manipulation by the operator has been reduced to an absolute minimum, as he merely adjusts the height of the apparatus table until the subject is properly located in the view finder, and then a forward motion imparted to the operating handle causes the photograph to be made. A pull on the operating handle then advances the film for the next exposure, and the apparatus is thereupon ready for the next subject to be photographed. Interlocking means are provided to prevent double exposures, by which I mean that the shutter cannot be operated until a new film area is before the exposure opening. Such interlock particularly cooperates with the other features of the invention, as, when photographing a large group of subjects, the operator might very easily make a number of double exposures if an interlocking means were not provided, and each time a double exposure is made, at least two subjects will have to be rephotographed, thus often causing great inconvenience.

Figure 10:
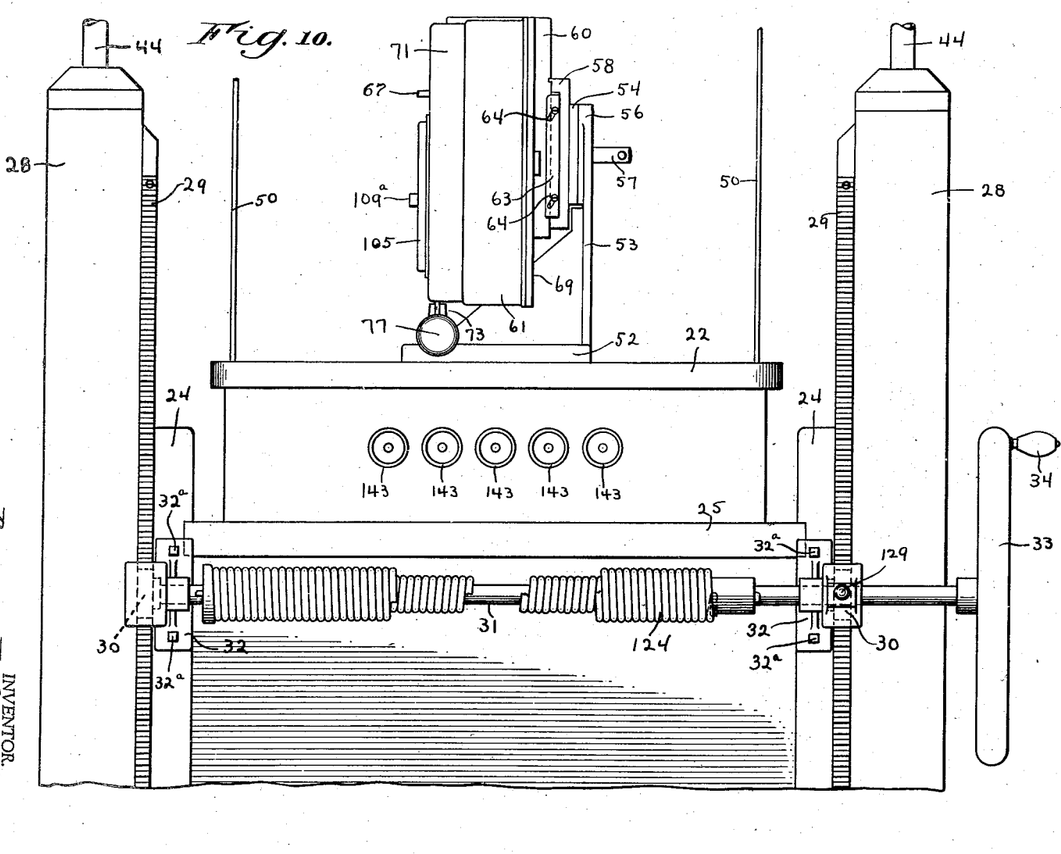
Fig. 10 is a partial rear view, in elevation, showing the mounting of the camera in its relation to the camera stand.
Figures 11, 12, 13:
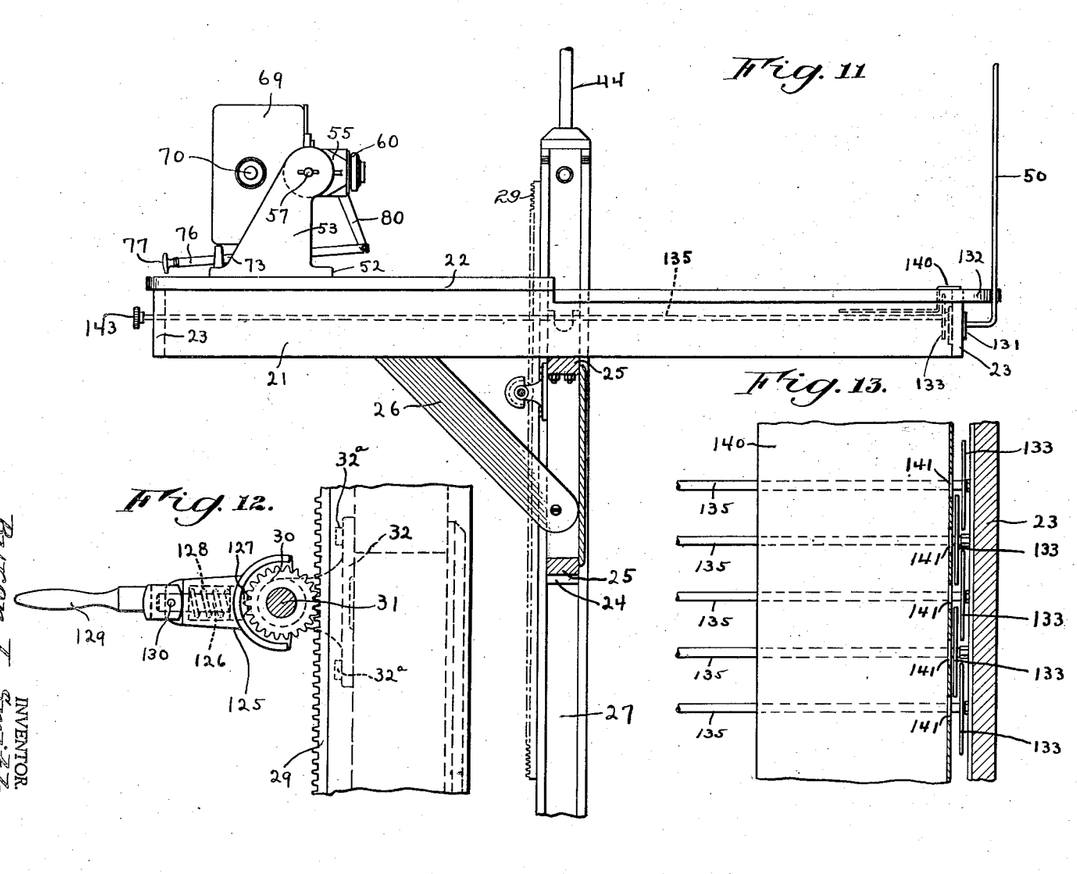
Fig. 11 is a right hand side elevation of the structure shown in Fig. 10, with certain parts broken away to show clearly the apparatus table with the camera of the unit mounted in operative relation.
Fig. 12 is an enlarged detail of a part of the structure shown in Fig. 11, indicating the camera table and the elevating mechanism with the lock therefor.
Fig. 13 is a partial plan view of the counting mechanism taken on the broken line 13—13 of Fig. 17.

Referring now to the figures of the drawings and first mainly to Figs. 1, 10, 11 and 14, the table-top structure is indicated generally at 20 (Fig. 3), and is made up of two side beams 21, 21 having attached thereto a table-top proper 22 and of transversely extending end members 23, 23 connecting said side beams 21, 21, so that with the said side beams and the table-top proper 22, there is constituted a rectangular unit carried by an upright frame consisting of upright side members 24, 24, cross members 25, 25, and angular braces 26, 26. The said side members 24, 24 slide in grooves 27, 27 provided in the upright posts 28, 28, to which are attached in any suitable manner gear racks 29, 29, with which mesh gears 30, 30, best shown in Fig. 12 as carried on a transverse shaft 31 itself supported by brackets 32, 32, attached to the said side members 24, 24, of the table support, by means of bolts 32a, 32a, as best shown in Fig. 10. Also attached to the shaft 31 is an elevating or table-positioning wheel 33 having a handle 34 for the purpose of raising or lowering the table structure. The operation of the said table-positioning mechanism will be subsequently described.

In the description, the front of the apparatus is the end at which the person to be photographed stands, and the rear is the end at which the operator stands.

Attached to the lower ends of the upright posts 28, 28 are the lower, rear, supporting members 35, 35, and the lower, front, supporting members 36, 36, the latter being equipped with casters 37, 37, and the former with a caster 38, thus providing means permitting ready change in position or location of the apparatus.

Figures 1, 2:
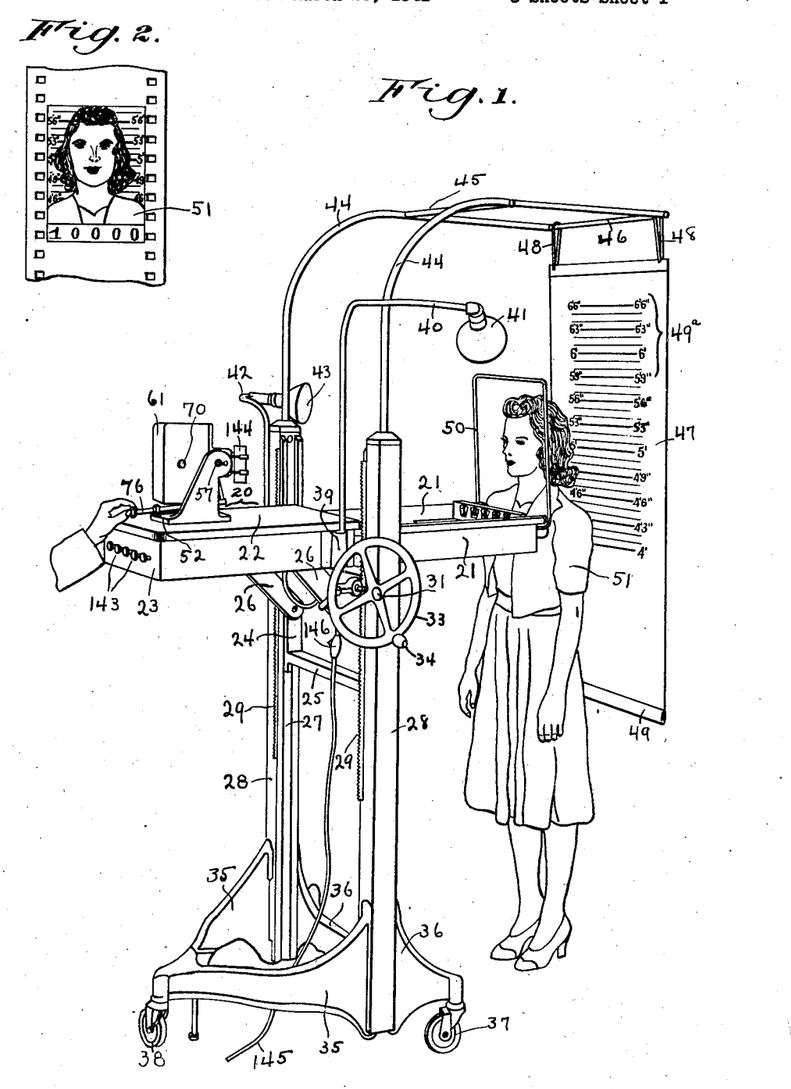
Fig. 1 is a perspective view of the photographic identification equipment unit with a subject in position for the making of a photograph, primarily for identification purposes.
Fig. 2 is a detail in elevation showing a photographic print as made by the said photographic identification equipment unit.

To the side beams 21, 21 of the table-structure are attached by screws or otherwise lamp support brackets 39, the right hand bracket only being shown in Fig. 1, and thereinto is inserted or attached a suitable rod or preferably a tube 40 supporting the right hand lamp 41. It is shown as extending vertically upward a suitable distance, and then as bent to provide a horizontal terminal part. Into the left hand bracket, which is not shown, but which is desirably of similar construction, is attached a lamp support tube or rod 42, preferably of lesser vertical extent, and to which is fitted the left hand lamp 43. Attached to the vertical posts 28, 28 are upright tubes or rods 44, 44, curved over at their upper ends and there provided with a spacing tube, rod or brace 45, and a background-attaching tube or rod 46, the construction shown providing means for hanging a background screen 47 by straps 48, 48, as shown in Fig. 1. The said background screen has provided at its lower end a hem 49 in which may be placed a metal rod serving to cause the background screen 47 to hang under sufficient tension to keep it straight or unwrinkled and plumb with the person being photographed, hereafter sometimes referred to impersonally as the "subject." The front face of the said background screen 47 is provided, as shown, with a scale 49a marked transversely in feet and inches so that the photograph taken will show the height of the subject photographed. The back side of the said background screen 47 is left blank, so that when it is desired to make a photograph without using the height scale, it is merely necessary to reverse the said background screen 47.

Attached to the said side beams 21, 21 is a suitable metallic frame 50, shown in use in Fig. 1, and which constitutes a view finder for locating or positioning the photographic subject indicated at 51 in Figs. 1 and 2, and who may be one of the many employees of a large manufacturing plant, where the unit herein disclosed finds important use.

As will now be fully disclosed in detail, I have by my invention provided a photographic unit including a camera, with a projecting shutter-release member and a magazine therefor structurally distinct therefrom and having a part protruding therefrom and operatively connected to the film feeding means of said magazine, the said unit also including a movable operating member for said camera and said magazine, the said unit having means for mounting the said camera and said magazine on a suitable support in substantial fore-and-aft alignment, the said movable operating member being supported exteriorly to said camera and magazine, for movement by the operator when on such suitable support, there being means exterior to said camera and to said magazine and connected to said movable operating member, and positioned so as to act exteriorly of the camera upon said projecting shutter-release member of the camera and also to act exteriorly of said magazine upon said part projecting from said magazine.

Figure 3:
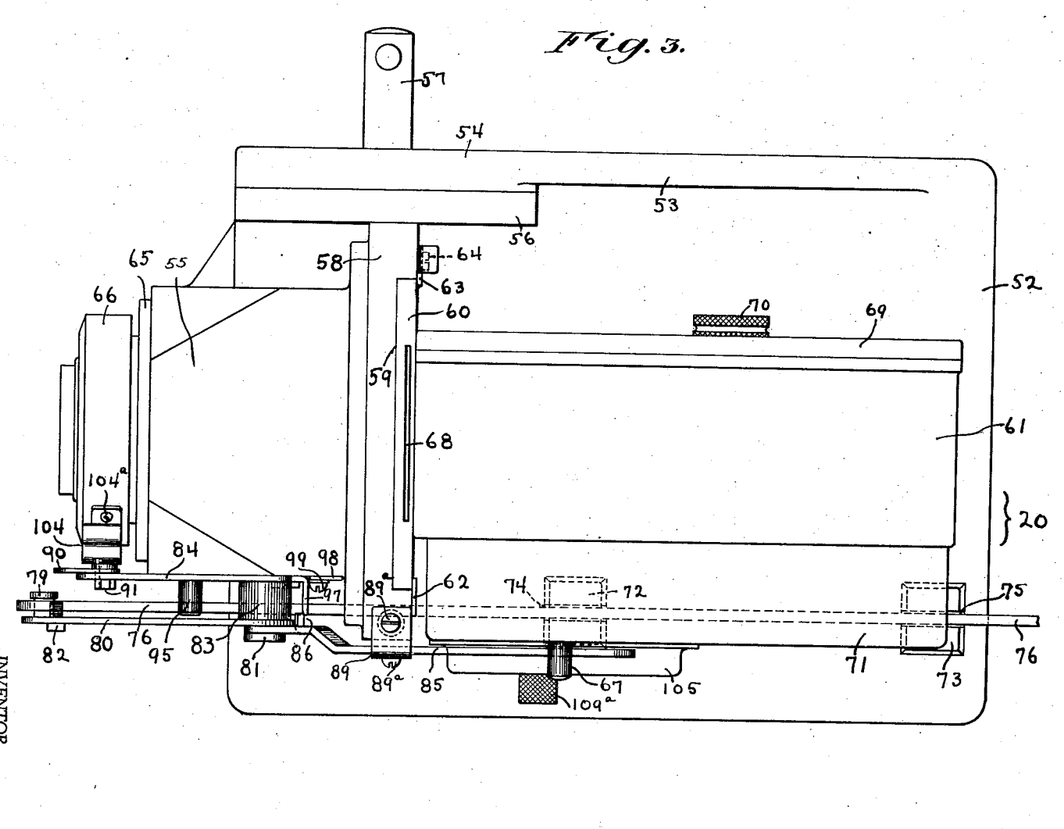
Fig. 3 is a top plan view of the camera of the unit, showing the film magazine mounted in operative relation thereto.
Figure 7:
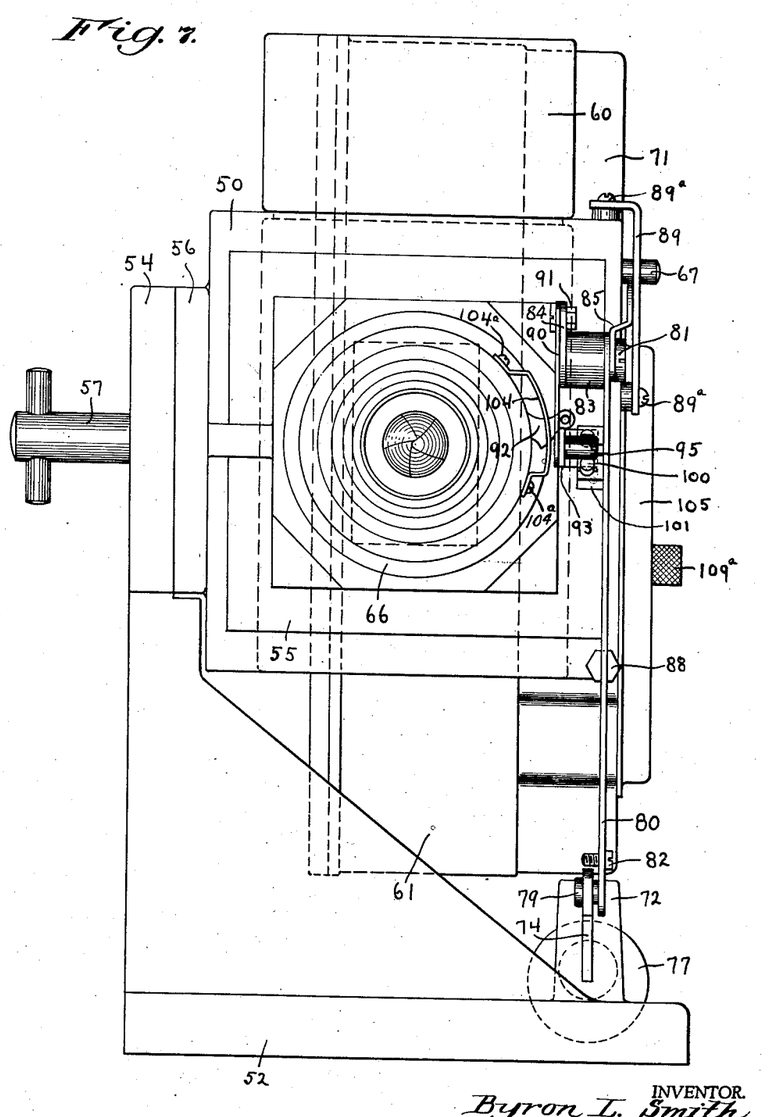
Fig. 7 is a front elevation of the camera and camera mounting bracket with the film magazine in place.

Referring next particularly to Fig. 3, but also to Figs. 1, 4, 7, 10, 11 and 14, disclosing the camera and the means for supporting and operating the same, there is attached to the table structure 20 a camera-support bracket 52 having a vertically extending member 53 (Figs. 10 and 11) terminating in a cylindrical pad or block-like part 54 providing a support for the camera indicated at 55, and which is itself provided with a cylindrical pad or block-like part 56 (best shown in Fig. 3) which is held in contact with the said cylindrical pad 54 by a clamping screw 57, as best shown in Fig. 7. The said camera, the structure of which may be widely varied within the scope of my invention, is here shown as made up of a hollow square casting having a vertical extending member 58, shown in Figs. 3 and 4, preferably cast integral therewith, and which is provided with a recess 59, shown in Fig. 3, and into which is fitted a flange 60 of a film magazine 61. As shown in Fig. 3, the flange 60 is held in position on one side against the casting or member 58 of the camera 55, by means of a clamping strip 62 and on the opposite side by means of a slide lock 63, shown also in Fig. 10, and which is attached to the said vertical camera casting or member 58 by shoulder screws 64, 64.

Attached to the front of the body casting of the camera is the usual lens flange 65, to which is attached a between-the-lens shutter 66, preferably of the so-called automatic type, by which is meant that the construction is such that one operation or movement of the shutter-operating lever, hereinafter described, serves both first to tension the shutter and then to cause the release of said shutter. The said magazine 61 is preferably substantially the same as shown in the patent to Edson S. Hineline, No. 2,107,074, dated February 1, 1938, to which reference may be made, with the preferred exception that the pneumatic cylinder thereof provided for operating the film feeding mechanism has been omitted, and a pin 67, best shown in Figs. 4, 7, 8 and 9, has been attached to the operating lever of the said film feeding mechanism, and passes through an arcuate slot or opening 67a in the magazine mechanism cover, and by which pin the film feeding means in the magazine is operated. Nevertheless within the scope of my invention, any magazine carrying 35 mm. film and feeding two standard "frames" for each operating cycle, and capable of operation by reciprocating motion, is readily adaptable in and with my invention. I have chosen, however, to use the structure disclosed in the said Hineline patent, because it is particularly well adapted for the purpose. The magazine thereof having been on the market for several years and well known in the art, a detailed description thereof is unnecessary excepting in so far as it is peculiarly related to my invention, as will hereinafter appear.

The said magazine 61 is equipped with the usual film take-off and take-up spools, a sprocket wheel for advancing the film, an exposure opening and a pressure pad, and it is also equipped with an elongated opening 68, shown in Fig. 3, and which receives the usual dark slide to protect the film in the magazine when the latter is removed from the camera, the magazine being also equipped with the usual cover 69 held thereto by clamping screw 70, and with the usual mechanism cover or housing 71.

I will next refer to the means of my invention for feeding the film and for operating the shutter, and in so doing I will refer particularly to Figs. 3, 4, 5, 7, 8 and 9.

Figures 4, 5, 6:
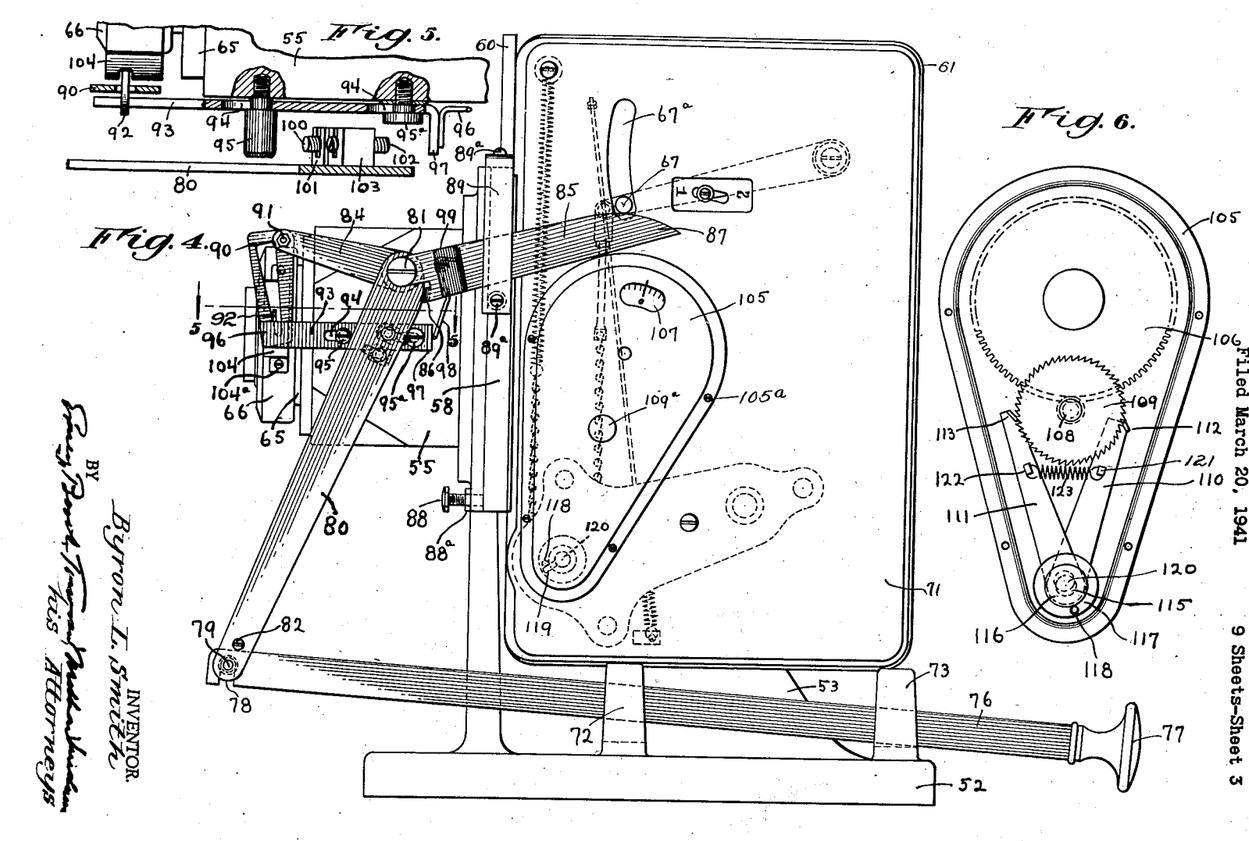
Fig. 4 is a left side elevation of the said camera and film magazine.
Fig. 5 is an enlarged detail, partially in section, taken on the broken line 5—5 of Fig. 4.
Fig. 6 is a rear plan view of the picture or exposure counting mechanism.

To the camera support 52, as shown in Fig. 3, are attached guides 72, 73 provided with slots 74, 75 respectively, in which rides a horizontally positioned, flat, operating bar 76 having a handle or knob 77, best shown in Fig. 4. The opposite end of the operating bar 76 is provided with a slotted opening 78 which engages a shoulder pin or rivet 79 attached to a main operating arm 80 having an upright position, being pivoted at its upper end on a screw 81 threaded into the camera casting 55. The said horizontally positioned, operating bar 76 is prevented from being removed from the shoulder rivet 79 by a locking screw 82. The said upright arm 80, as shown best in Fig. 7, has attached thereto a bushing or spacer 83, to the opposite end whereof is attached a shutter-operating lever arm 84, as shown in Fig. 4. The said lever arms 80 and 84 are securely attached to the bushing or spacer 83, thus causing any movement of the said upright arm 80 to be transmitted to the shutter-operating arm 84. Riding on the screw 81 is a third lever arm 85, best shown in Fig. 4, and constituting the film feeding lever, which is provided at one end with an inwardly turned projection or shoulder 86, shown in Fig. 4, engaged by the lever 80, when the latter is moved in a counterclockwise direction.

When the said knob 77 is pulled to the right, viewing Fig. 4 (to the left viewing Fig. 1), the upright lever arm 80 is caused to move in a contraclockwise direction by the bar 76 and the shoulder rivet 79. The film feed lever 85 will also thereby be moved in a contraclockwise direction inasmuch as the downwardly turned projection or shoulder 86 engages one face of the lever arm 80. The pin 67 protruding through the slot 67a, as heretofore described, will be moved upward in said slot 67a under the influence of the cam face 87 at the free end of the said film feed lever 85, as the latter is caused to be moved in a contraclockwise direction, until the said pin 67 reaches the end of its travel, which will cause the next unexposed area of the film to be brought in position before the exposure opening of the camera. The said upright lever arm 80 is prevented from making further movement in a contraclockwise direction because of an adjusting screw 88 threaded into the camera supporting casting 58 and having a lock nut 88a. The position of the parts at the end of the movement referred to will be that shown in Fig. 8. The said film feeding lever 85 is guided and limited in its motions by any suitable means such as a guide strap 89, shown in Figs. 4, 7, 8 and 9, as held to the said camera supporting casting 58 by screws 89a, 89a.

Figure 8:
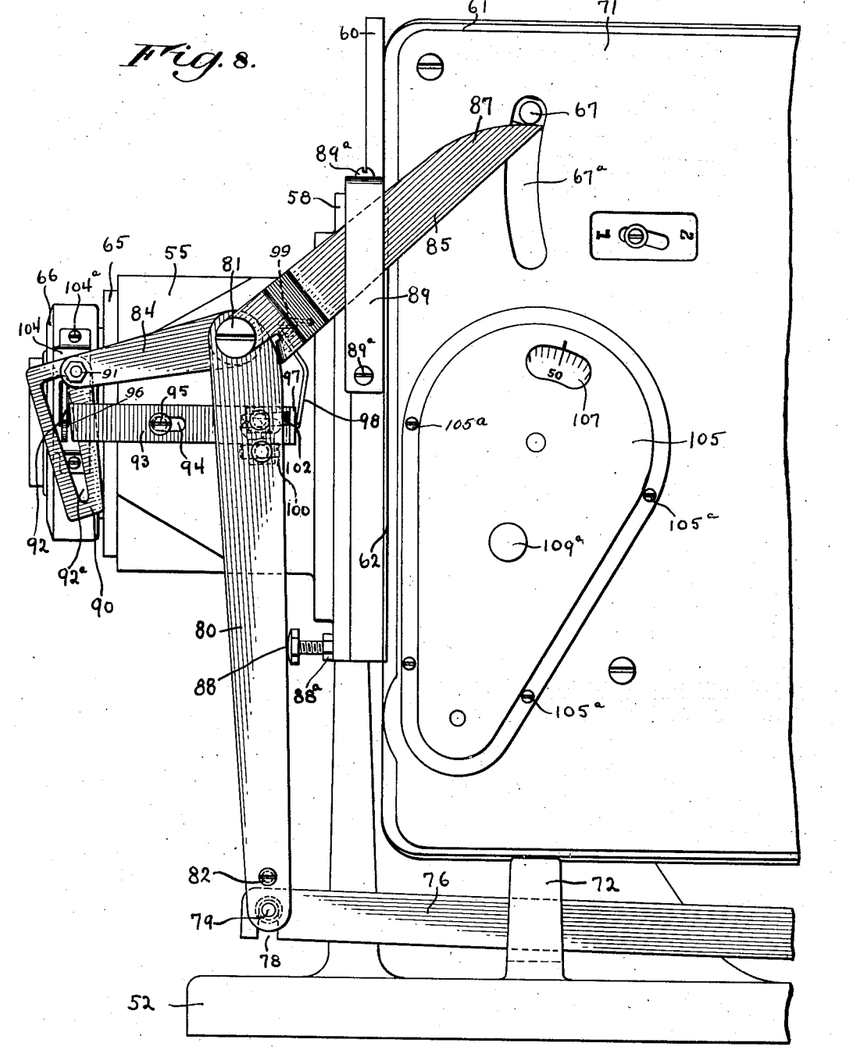
Fig. 8 is an enlarged elevation of Fig. 4, showing the position of the parts when the operating handle has been pulled, thereby feeding a new film area.
Figure 9:
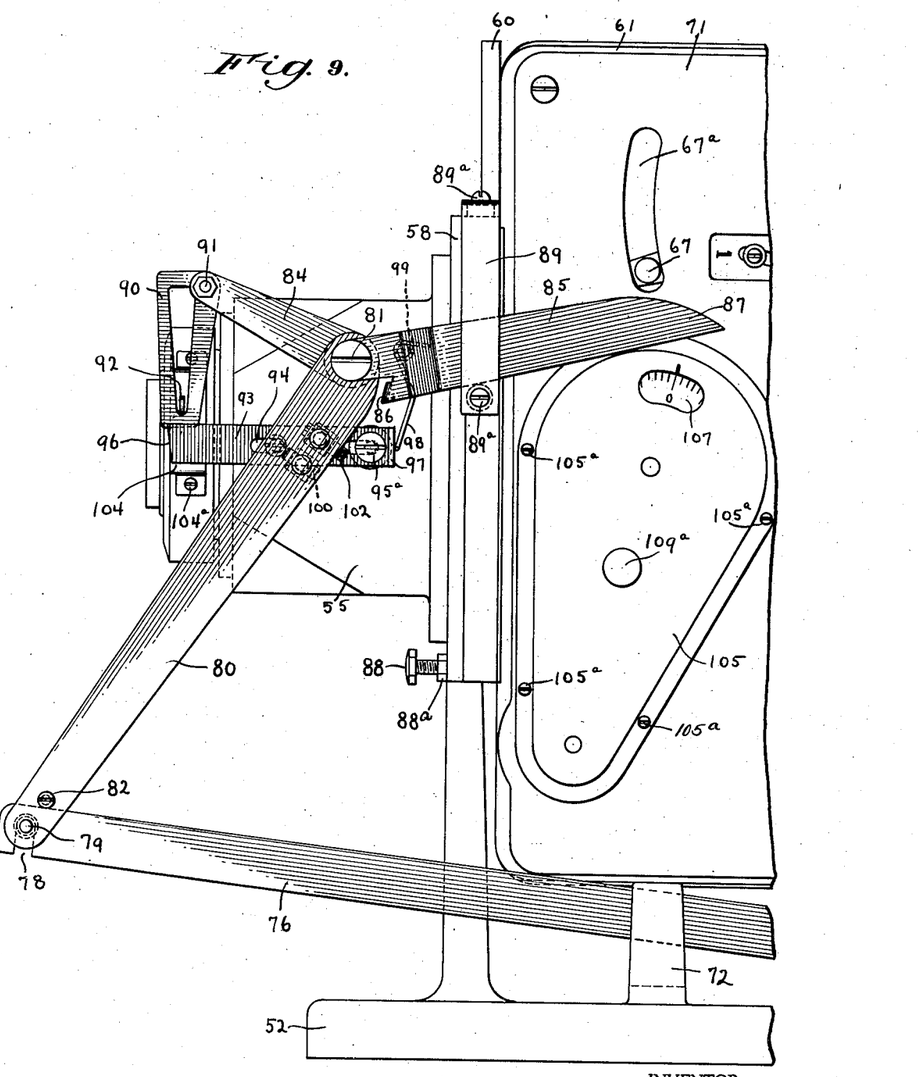
Fig. 9 is a view similar to Fig. 8, but wherein the operating handle has been pushed all the way forward, to cause the shutter to be operated.

To the shutter-operating lever arm 84 is attached a shutter-operating link 90 in any suitable manner as by a bolt and nut 91, the purpose of the link 90 being to engage the shutter release lever 92, shown in edge view in Figs. 8 and 9, and in side elevation in Fig. 7. To that end the said link 90 is provided with a triangularly shaped opening 92a within which is received at all times the end of the shutter release lever 92, which operates the shutter for making an exposure when moved in an upward direction (see Fig. 4).

When the operating knob 77 on bar 76 is moved in a forward direction (namely, to the left viewing Fig. 4 or to the right viewing Figs. 1, 11 and 14), the lever arms 80 and 84 are caused to be moved in a clockwise direction, and the shutter operating lever 92 is caused to be moved upwardly until the shutter 66 is caused to open and then to close, thus making an exposure.

To the side of the camera body casting 55, as shown in Figs. 4 and 5, is attached a horizontally positioned, flat bar 93, herein termed an interlocking bar, it having slots 94, 94, and being held to the camera body casting 55 by means of shoulder screws 95, 95a, best shown in Fig. 5. The forward end of the said interlocking bar 93 is cut off at a slight angle, as indicated at 96, and the opposite end thereof has an upturned end 97 engaged by a spring 98 attached to the camera body casting 55 by means of a screw 99, shown in Fig. 3.

When the said knob 77 is pushed all the way forward (that is, to the left viewing Fig. 4, or to the right viewing Figs. 1, 11 and 14), thus operating the shutter release lever 92, the interlocking bar 93 is moved forward under the influence of the said spring 98 and prevents further operation of the shutter release lever 92, inasmuch as it is prevented from returning to the starting position by said interlocking bar 93.

The said upright lever arm 80 is limited in its forward motion by an adjustable screw 100, shown in Fig. 5, which contacts with the head of the shoulder screw 95. It is important to provide means for accurately limiting the movement of the said lever arm 80 when it is moving in a clockwise direction, so as to avoid injuring the shutter mechanism. Before a second exposure can be made, the knob 77 must be pulled to the right viewing Fig. 4 (to the left viewing Figs. 1, 11 and 14), as far as possible, thus advancing the next unexposed area of film before the exposure opening of the camera.

As the upright lever arm 80 is caused to be moved in a contraclockwise direction under the influence of the operating bar 76, the interlocking bar 93 is caused to be moved to the right viewing Fig. 4, under the influence of a screw 102, threaded into a block 103 attached to the upright lever arm 80, as best shown in Fig. 5. The said screw 102 will contact with the upturned end 97 of the interlocking bar 93, thus causing it to be moved to the right viewing Fig. 4 and withdrawing the interlocking bar 93 from the shutter release lever 92, thus allowing the latter to be returned to its starting position, as best shown in Fig. 8, by suitable spring means within the shutter, and the camera is now ready for a second exposure, which will be made by a forward push on the operating knob 77 (namely, toward the left viewing Fig. 4 or to the right viewing Figs. 1, 11 and 14).

As best shown in Figs. 4, 8 and 9, to the shutter 66 is attached a shutter-release lever guard-plate 104, by means of screws 104a, 104a, such guard plate preventing injury to the shutter release lever 92 and constituting also a guide therefor in its functioning movement.

I have provided means to determine the amount of film remaining unexposed in the camera at any time, and for this purpose I have provided a counter which is advanced as each picture-taking cycle occurs and which is best shown in Figs. 6, 8 and 9. The said counter is preferably enclosed in a pressed metal housing 105 attached to the mechanism cover or housing 71 by screws 105a, 105a.

In Fig. 6 is shown the counter mechanism removed from the mechanism housing, and in Figs. 8 and 9 it is shown secured in position thereto. Referring to said figures, a large indexing wheel or gear is indicated at 106, being graduated on one side to indicate the number of exposures. The counter dial may be read through the opening 107 of the counter cover or housing 105. Meshing with the said wheel or gear 106 is a pinion 108 having attached thereto a ratchet wheel 109 caused to be advanced by cooperating pawls 110, 111, provided respectively with dogs 112 and 113. The said pawls are caused to be advanced by an eccentric 115, shown in dotted lines in Fig. 6, which is attached to the counter mechanism housing 105 by a shoulder rivet 116. The said eccentric 115 is provided with an enlarged rim or collar 117 to which is attached a drive pin 118 caused to be operated by contact of a pin 119 fitted into the film-measuring sprocket shaft 120. Inasmuch as the film-measuring sprocket shaft 120 is caused to rotate as the film is advanced through the magazine, the said pin 119 engages pin 118, as shown in Fig. 4, thus causing the eccentric 115 to be rotated, thereby oscillating the pawls 110, 111, and driving the ratchet wheel 109, thereby rotating the index wheel or gear 106. The said pawls 110 and 111 are provided with upturned lugs 121 and 122 respectively, to which are attached the opposite ends of a coiled spring 123, the purpose whereof is to cause the said dogs 112 and 113 to engage the ratchet teeth of the ratchet wheel 109. The counter can be reset to zero by the reset knob 109a attached to the counter ratchet wheel 109, as shown in Figs. 3 and 9, which needs no detailed description.

I will next describe the table positioning means and the numbering mechanism, and for that purpose will refer to Figs. 10 to 18.

As already described, the camera 55 is itself mounted upon the table top 22 carried by an upright frame or structure between the two upright posts 28, 28, being caused to be moved up and down by turning the wheel 33, thereby rotating the shaft 31 with its attached pinions 30, 30 that mesh with the racks 29. A counterbalance spring 124, best shown in Fig. 10, is provided to counterbalance the weight of the table-structure in a manner not requiring further description.

As the table-structure including the table top 22 is moved vertically along the upright posts 28, 28 and the correct height has been selected, it is desirable to lock the table-structure in such position. This is preferably accomplished by the means best shown in Fig. 12, and consisting of a bracket 125 constituting an integral part of one of the shaft brackets 32. Fitted into such bracket is a short plunger, rod or stud 126, the opposite end whereof is provided with a dog 127, to engage between teeth of the gear 30. The dog 127 is moved forward to engage between teeth of the gear 30 by a coiled spring 128, and the dog is withdrawn from such engagement by a handle 129 hinged to the end of the plunger or rod 126 by a hinge pin 130. Inasmuch as the width of the handle at its base is greater than the distance of the hinge pin 130 from the face of the handle which engages the bracket 125, when said handle 129 is moved either downwardly or upwardly, said plunger or rod 126 will be moved to the left viewing Fig. 12, thus withdrawing the dog 127 from engagement with or between the teeth of the gear 30, allowing the table-structure to be moved upwardly or downwardly as required.

Figures 12, 14, 15, 16, 18:
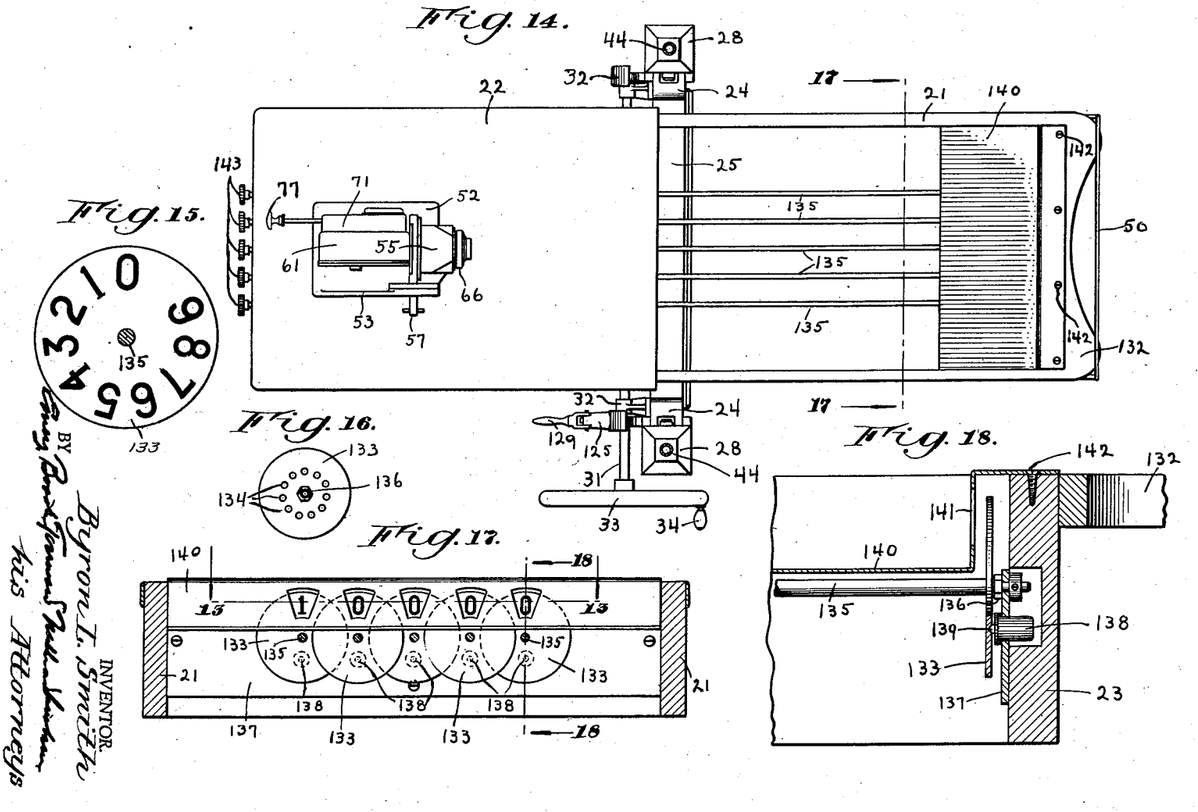
Fig. 14 is a top plan view of the photographic identification equipment unit, with the lamps removed showing the relation of the various parts making up the said unit.
Fig. 15 is an enlarged plan view of one of the numbering disks of the unit.
Fig. 16 is a rear view of Fig. 15, on a reduced scale, showing the indexing indentations.
Fig. 18 is a detail in vertical section taken through Fig. 17 on the line 18—18 thereof, showing the mounting of the said numbering disks and detents therefor.

As previously stated, to the front of the table-structure is attached the wire view-finder 50 which is of such shape as to outline the subject being photographed, and its contour is symmetrical with respect to the axis of the camera lens. The said view finder 50 is attached to the front cross member 23 of the table structure by means of suitable bolts 131, and attached to the said front cross member 23 is a horizontally extending member 132, shaped, as best shown in Fig. 14 table-top structure and the operator at the other end thereof in taking the photograph, a camera firmly supported with an upright frame on said table-top structure in fixed position at the operator's end thereof and having a projecting shutter-release member, a film receiving and feeding magazine attached to said upright camera frame in horizontal fore-and-aft substantial alignment with said camera but structurally distinct and separate therefrom, a push-and-pull rod-like member supported at the operator's said end of the table-top structure for his operating movement in a direction lengthwise the table-top structure, close to and in substantial parallelism to the upper face thereof, exteriorly both of said camera and said magazine, and means exterior to said camera and to said magazine and connected to said rod-like member, and positioned to act upon the projecting shutter-release member of said camera at a point exteriorly of the camera, and also to act exteriorly of said magazine upon a part protruding from the said magazine, and operatively connected to the film feeding means of said magazine, thereby to cause shutter opening and closing and also film feeding.

2. A photographic unit including a camera with a projecting shutter release member, and a magazine therefor structurally distinct therefrom and having a part protruding therefrom and operatively connected to the film feeding means of said magazine, said unit also including operating means for said camera and said magazine, said unit having means for mounting the said camera and said magazine on a suitable support in substantial fore-and-aft alignment, the said operating means including a push-and-pull rod-like member supported exteriorly to said camera and magazine, for movement by the operator in a to-and-fro substantially horizontal direction in a path substantially at the bottom of said camera when on such suitable support, means exterior to said camera and said magazine and connected to said rod-like member, and positioned so as to act exteriorly of the camera upon said projecting shutter-release member of the camera and also to act exteriorly of said magazine upon said part projecting from said magazine.

3. A photographic unit in accordance with claim 2, but wherein said operating means supported exteriorly to said camera and said magazine includes a pivoted lever arm directly connected to said rod-like member and two other members both connected to said lever arm, one of which other members engages the shutter release member, and the other of which acts upon said part projecting from the film feeding mechanism in said magazine, thereby to operate the said shutter and feed the film in said magazine.

4. A photographic unit in accordance with claim 2, but wherein said operating means supported exteriorly to said camera and said magazine includes a lever arm 80 connected to said rod-like member and having a pivot 81, and two lever arms 84, 85 pivoted co-axially with the lever arm 80 and extending along a face of said camera and a face of said magazine respectively, to engage and operate respectively the shutter release member and the film feeding means in said magazine.

5. A photographic unit in accordance with claim 2, but wherein said operating means supported exteriorly to said camera and said magazine includes a main operating lever arm 80 connected to said rod-like member, and a shutter operating lever moved by movement of said lever arm 80 and having means to operate said shutter release member of the camera, and also includes a slidable interlocking bar 93 spring pressed in one direction to prevent further operation of said shutter release member and moved in the opposite direction by film-feeding movement of the said main operating lever arm 80, to allow the said shutter release member to be returned to its starting position.

6. A photographic unit in accordance with claim 2, but wherein said operating means supported exteriorly to said camera and said magazine includes a main operating lever arm 80 connected to said rod-like member, a shutter operating lever moved by movement of said lever arm 80 and having a link 90 to engage the shutter release member of the camera, and also includes a slidable interlocking bar 93 spring pressed in one direction to prevent further operation of said shutter release member and having a projection thereon to be engaged by the said operating arm 80 whereby the said interlocking bar 93 is moved away from the shutter release member to permit said shutter release member to be returned to its starting position.

7. A photographic unit in accordance with claim 2 but wherein said operating means supported exteriorly to said camera and said magazine includes a main operating lever arm 80 connected to said rod-like member, and also includes a lever arm 85 that is moved by movement in one direction of the said lever arm 80, the said lever arm 85 having a cam-like portion to engage the said part projecting from said magazine, so as thereby to actuate the film feeding mechanism within said magazine.

8. A photographic unit in accordance with claim 2, but wherein said operating means supported exteriorly to said camera and said magazine includes a main operating lever arm 80 connected to the said rod-like member and also includes a lever arm 85 that is moved by movement in one direction of the said lever arm 80, the said lever arm 85 being a cam-like portion to engage the part projecting out from said magazine, so as thereby to actuate the film-feeding mechanism within said magazine, the said lever arm 85 also having a shoulder 86 to be engaged by the said lever arm 80 in its movement so as to impart film-feeding movement to said lever arm 85.

9. A photographic identification unit adapted to take photographs of persons in upright position, and for that purpose having a table-top structure supported in horizontal position substantially above the floor, so that such photographic subject may stand at one end of the table-top structure and the operator at the other end thereof in taking the photograph, a camera firmly supported on a supporting frame on said table-top structure in fixed position at the operator's end thereof and having a projecting shutter-release member, a film receiving and feeding magazine attached to said camera supporting frame in horizontal fore-and-aft substantial alignment with said camera but structurally distinct and separate therefrom, a movable operating member supported at the operator's said end of the table-top structure for his operating movement, said movable operating member being mounted on said table-top structure exteriorly both of said camera and said magazine, and means exterior to said camera to fit or locate the body of the subject being photographed.

The numbering device constituting a feature or part of the present invention, best shown in Figs. 14, 17 and 18, is made up of a series of independent but cooperating disks 133, each having numerals from 0 to 9, and one blank space, as shown in Fig. 15, the latter being provided to make it possible to make a photograph without any numeral showing.

I have herein represented the said disks 133 as five in number, but obviously any number may be used. Each of such disks is provided with countersunk openings or depressions 134, best shown in Fig. 16 and corresponding to the positions of the numerals on the opposite space of the disk. Each disk 133 is provided with a shaft 135 having a reduced diameter, a portion whereof is threaded to receive a nut 136 used to clamp such disk 133 to its shaft 135. To the cross member of the table-structure is attached a plate 137, as shown in Figs. 17 and 18, providing a bearing structure for the reduced ends of all the said shafts 133, which are shown in their relative positions in Fig. 14. Also attached to the said bearing plate 137 for each of the disks 133 is a series of detent devices 138, the number thereof being indicated in dotted lines in Fig. 17 as five in the disclosed embodiment of the invention. Each of said detent devices 138 desirably has a suitable ball detent 139 engaging the selected one of the openings or depressions 134 of the corresponding disk 133. In this manner, the set of detents 138 holds all the disks 133 accurately in position, and covering the said several disks is a cover or guard plate 140 having openings 141 through which the numerals on the several disks 133 are visible. The said guard plate 140 is attached to the cross member 23 of the table-structure by wood screws 142 and on the opposite ends of the several rods 135 are provided handles 143, shown in Figs. 10 and 14 thus making it possible for the operator at the rear of the unit to turn any or all of the disks 133, thus selecting any numerals thereof that it may be desired to have photographed as a part of the foreground of the subject, or to omit numerals entirely.

In order to make it possible for the person being photographed to observe just what will appear in his or her photograph, I have provided a mirror 144, best shown in Fig. 1 as attached to the camera body casting 55 in any suitable manner as by bolts, but so that it may be moved or adjusted in such a way that when the person about to be photographed is in position in front of the finder 50, the said mirror 144 will reflect precisely what the camera will photograph, and can be accurately viewed by such person.

I have herein disclosed a photographic identification unit that is adapted to a wide variety of uses and can be readily operated with entire satisfaction by those not particularly schooled in the art of photography, as will be evident from the foregoing description, as well as from the following brief reference to the operation of the unit.

As shown in Fig. 1, an electric cord 145 is connected to the usual electrical outlet, and the switch 146 is closed, thus causing the lamps 41 and 43 to be illuminated, and as they are carried by the table structure, their proper position has been automatically achieved in moving the table structure to the proper level or height. The person to be photographed, who may be assumed to be one of the employees of a large manufacturing establishment, is placed between the view finder 50 and the background screen 47 at the front of the unit, and the height of the said view finder, together with that of the table-structure and all parts carried thereby, is quickly secured as set forth, so that the person to be photographed is properly framed in the center of the view finder 50, and stands with the upper part of his or her body in contact with the locating member 132, whereupon the operating knob 77 is pushed forward (that is, to the left viewing Fig. 4 or to the right viewing Figs. 1, 11 and 14), thus by a single movement operating the shutter and causing an exposure to be made.

In the event that it is desirable to photograph a number along with the subject being photographed, the proper numerals are selected by turning the handles or knobs 143 until the proper total number appears in the window 141, as, for example, the number 10,000 appearing in Figs. 2 and 17. Then the camera is operated precisely as previously described.

When a sufficient number of photographs of different persons has been made, the exposed film is removed from the magazine, developed and printed, and each resulting print will be, for exampe, like that indicated in Fig. 2. It is not necessary, however, to make the prints on perforated paper as there shown, as any other suitable paper may be used. To expedite operations, it is desirable, however, to use a paper perforated along the edges as indicated.

Inasmuch as the illumination is in this case of a fixed value, as will be evident from the foregoing description, an aperture and shutter speed of the camera may be selected to give satisfactory results, depending upon the particular sensitized material that is used. After such adjustment has been once made (this is usually done at the factory), no attention is required on the part of the operator other than properly to position the mechanism at the correct elevation, making certain that the person to be photographed stands in the proper position. Thereupon a forward push of the knob 77 causes a photograph to be made, and a rearward or withdrawing pull of said knob 77 causes the next unexposed area of the film to be moved into proper position at the exposure opening of the camera.

It will be evident from the foregoing description that the several parts or features of the unit all cooperate in producing a unitary result, and that they are all so coordinated in timing and in operation as jointly to contribute to that single end, and are therefore to be claimed in combination as co-acting parts of such unit. The parts all cooperate for the very rapid taking singly of photographs of a large number of persons in quick succession, such as employees of manufacturing establishments, though, of course, the unit is not limited to that use, to which, however, it is peculiarly adapted.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic identification unit adapted to take photographs of persons in upright position, and for that purpose having a table-top structure supported in horizontal position substantially above the floor, so that such photographic subject may stand at one end of the and to said magazine and connected to said movable operating member, and positioned to act upon the projecting shutter-release member of said camera at a point exteriorly of the camera, and also to act exteriorly of said magazine upon a part protruding from the said magazine, and operatively connected to the film feeding means of said magazine, thereby to cause shutter opening and closing and also film feeding.

10. A photographic unit including a camera with a projecting shutter-release member, and a magazine therefor structurally distinct therefrom and having a part protruding therefrom and operatively connected to the film feeding means of said magazine, said unit also including a movable operating member for said camera and said magazine, said unit having means for mounting the said camera and said magazine on a suitable support in substantial fore-and-aft alignment, the said movable operating member being supported exteriorly to said camera and magazine, for movement by the operator when on such suitable support, means exterior to said camera and said magazine and connected to said movable operating member, and positioned so as to act exteriorly of the camera upon said projecting shutter-release member of the camera and also to act exteriorly of said magazine upon said part projecting from said magazine.

11. In a photographic unit wherein is a suitably supported camera having a projecting shutter-release member, and wherein there is an adjacent but structurally separate, suitably supported magazine, having a part protruding therefrom, and which part is operatively connected to the film feeding means of the magazine, the following combination of means for operating the shutter of said camera and the film feeding means of said magazine, viz: a movable operating member for said camera and magazine, supported for manual operation by the operator, said movable operating member being supported exteriorly of said camera and of said magazine, for movement by the operator; means exterior to said camera and to said magazine and connected to said movable operating member and positioned so as to act exteriorly of the camera upon said projecting shutter-release member of the camera, and also to act exteriorly of said magazine upon said part projecting from said magazine.

12. In a photographic unit wherein is a suitably supported camera having a projecting shutter-release member, and wherein there is an adjacent but structurally separate, suitably supported magazine, having a part protruding therefrom, and which part is operatively connected to the film feeding means of the magazine, the following combination of means for operating the shutter of said camera and the film feeding means of said magazine, viz: operating means for said camera and for said magazine, said operating means including a push-and-pull rod-like member supported exteriorly of said camera and of said magazine for movement by the operator in a direction toward and from said camera and said magazine; means exterior to said camera and to said magazine and connected to said rod-like member and positioned so as to act exteriorly of the camera upon said projecting shutter-release member of the camera and also to act exteriorly of said magazine upon said part projecting from said magazine.

13. A structure in accordance with claim 12, but wherein the said operating means supported exteriorly of said camera and of said magazine includes a pivoted lever arm directly connected to said rod-like member, and two other members both connected to said lever arm, one of which other members engages the shutter release member and the other of which other members acts upon said part projecting from the film feeding mechanism in the magazine, thereby to operate the shutter of the camera and to feed the film in said magazine.

14. A structure in accordance with claim 12, but wherein said operating means supported exteriorly of said camera and of said magazine includes a lever arm connected to said rod-like member, and two lever arms pivoted co-axially upon the pivot of said first mentioned lever arm and extending along a face of said camera and a face of said magazine respectively, to engage and operate respectively the shutter release member of the camera and the film feeding means in said magazine.

15. A structure in accordance with claim 12, but wherein said operating means supported exteriorly of said camera and of said magazine includes a main operating lever arm connected to said rod-like member, also includes a shutter operating lever moved by a movement of said main operating lever arm and having means to operate said shutter release member of the camera, and also includes a slidable interlocking bar, spring pressed in one direction to prevent further movement of the said shutter release member and moved in the opposite direction by the film feeding movement of the said main operating lever arm, thereby to allow the said shutter release member to be returned to its starting position.

16. A structure in accordance with claim 12, but wherein said operating means supported exteriorly of said camera and of said magazine includes a main operating lever arm connected to said rod-like member, also includes the shutter operating lever moved by movement of said main operating lever arm and having a link to engage the shutter release member of the camera, and also includes a slidable interlocking bar, spring pressed in one direction to prevent further operation of said shutter release member and having a projection thereon to be engaged by said main operating lever arm, and whereby the said interlocking bar is moved away from the shutter release member to permit said shutter release member to be returned to its starting position.

17. A photographic identification unit adapted to take photographs of persons in upright position and in accordance with claim 9, but wherein the said table-top structure has, at the subject's end thereof, photographic identification means so positioned as to appear in the photograph and including a series of associated but independent disks, each bearing numbers, and supported in upright position facing the operator, the said disks being supported on a transversely extending part of the table-top structure at the subject's end thereof, there being operating means for the said disks extending lengthwise the said table-top structure, with operating handles readily accessible to the said operator at his end of the table-top structure.

BYRON L. SMITH.